United States Patent
Blount

(10) Patent No.: US 6,545,073 B1
(45) Date of Patent: *Apr. 8, 2003

(54) ORGANIC PHOSPHORUS-INORGANIC PHOSPHORUS OXYACIDS COMPOUNDS AND COMPOSITIONS

(76) Inventor: David H. Blount, 6728 Del Cerro Blvd., San Diego, CA (US) 92120

( * ) Notice: Subject to any disclaimer, the term of this patent is extended or adjusted under 35 U.S.C. 154(b) by 0 days.

This patent is subject to a terminal disclaimer.

(21) Appl. No.: 09/644,499

(22) Filed: Aug. 24, 2000

(51) Int. Cl.⁷ .............................................. C08K 5/524
(52) U.S. Cl. ......................... 524/127; 558/61; 558/97; 558/98; 558/99; 558/111; 558/127; 558/155
(58) Field of Search ........................... 558/61, 155, 97, 558/99, 98, 111, 127; 524/127

(56) References Cited

U.S. PATENT DOCUMENTS

| | | | | |
|---|---|---|---|---|
| 2,908,708 A | * | 10/1959 | Beach | |
| 2,984,680 A | * | 5/1961 | Walsh | ........................ 558/99 |
| 3,019,249 A | * | 1/1962 | Gunderloy | |
| 3,131,207 A | * | 4/1964 | Ratz | |
| 3,197,496 A | * | 7/1965 | Le Suer | |
| 3,943,196 A | * | 3/1976 | Murch | |
| 3,943,197 A | * | 3/1976 | Murch | |
| 4,172,858 A | * | 10/1979 | Clubley | |
| 4,181,646 A | * | 1/1980 | Moedritzer | |
| 4,342,709 A | * | 8/1982 | Jaffe | |
| 5,430,081 A | * | 7/1995 | Ohmae et al. | |
| 5,681,798 A | * | 10/1997 | Forng et al. | |
| 5,788,915 A | * | 8/1998 | Blount | |
| 5,854,309 A | * | 12/1998 | Blount | |
| 6,054,515 A | * | 4/2000 | Blount | |

* cited by examiner

Primary Examiner—Peter Szekely

(57) ABSTRACT

A flame retardant composition is produced by mixing a flammable organic material with an organic phosphorus-inorganic phosphorus oxyacid compound or its salts. The organic phosphorus-inorganic phosphorus oxyacid compounds are produced by reacting an organic phosphorus compound with an inorganic phosphorus oxyacid. The organic phosphorus-inorganic phosphorus oxyacid compound may be reacted with a basic salt forming compound. The flammable organic material such as thermoplastic resins are made less flammable by melting-kneading the flammable material with the organic phosphorus-inorganic phosphorus oxyacid compound or it's basic salt, carbonization auxiliaries, a metal-containing compound having a carbonization acceleration effect, a comb-like polymer and a filler.

20 Claims, No Drawings

ORGANIC PHOSPHORUS-INORGANIC PHOSPHORUS OXYACIDS COMPOUNDS AND COMPOSITIONS

This application concerns novel organic phosphorus-inorganic phosphorus oxyacid compounds, it's basic salts and compositions. These compounds contain two or more phosphorus atoms in each molecule. The flame retardant compounds of this invention may be utilized as flame retardants by incorporating these compounds within or coating a more flammable organic material. In particular, it relates to flame retardant compounds and a flame retardant organic resin compositions, which are free from toxicity problems due to halogen gas generated during combustion or molding as in the use of a halogen-containing flame retardant compound.

BACKGROUND OF THE INVENTION

Basic nitrogen containing salts of organic polyphosphorus compounds were produced by Blount in U.S. Pat. No. 6,054,515 and utilized in flame retardant compositions. The organic phosphorus-inorganic phosphorus oxyacids compounds of this invention are novel. These novel compounds are an improvement over the basic salts of organic polyphosphorus compounds because they are a much better flame retardant compounds and cost less to produce. When the organic phosphorus-inorganic phosphorus oxyacid compound is incorporated in or on a flammable organic material it produces an intumescent composition. When this intumescent composition is exposed to a flame for a few seconds it begins to char and form bubbles within the char thereby protects the substrate against heat and fire damage for an appreciable time. This intumescence also reduces the amount of smoke produced. The organic phosphorus-inorganic phosphorus oxyacid compounds promote initial intumescence at a low temperature, which is much lower that required when a basic nitrogen salt of organic polyphosphorus compound or an organic phosphorus compound is utilized as the flame retardant compound. The flame retardant compounds of this invention will also with stand a higher temperature than the organic phosphorus compounds and basic nitrogen containing salts of organic polyphosphorus compounds before decomposing, and allows them to be mixed in thermoplastic resin to produce flame retardant reins.

The object of this invention is to produce organic phosphorus-inorganic phosphorus oxyacid compounds, its basic salts and compositions containing these compounds which are capable of rendering organic material less flammable. These flame retardant compounds may be used in the production of insulation foam, flexible foams, building components, coating agents, molded plastic products and as hydraulic fluids, lubricants, surfactants, molded plastic products and many other uses.

SUMMARY OF THE INVENTION

In one respect, the invention comprises reacting organic phosphorus compounds, containing phosphorus atom with a valence of 3–4, with inorganic phosphorus oxyacid compounds with phosphorus atoms with a valence of 5 to produce organic phosphorus-inorganic phosphorus oxyacid compounds. Another aspect, the invention comprises utilizing the organic phosphorus-inorganic phosphorus oxyacid of this invention by incorporating in, or apply on a more flammable organic material to render the organic material less flammable. Another aspect of the invention is a process to prepare the organic phosphorus-inorganic phosphorus oxyacid compound comprising serially contacting and reacting:

A) an organic phosphorus compound containing a phosphorus atom with a valence of 3–4;

B) an inorganic phosphorus oxyacid compound containing a phosphorus atom with a valence of 5; under conditions sufficient to prepare the organic phosphorus-inorganic phosphorus oxyacid compound.

Another aspect of this invention is to produce a flame retardant composition which comprising mixing and reacting:

A) an organic phosphorus compound containing a phosphorus atom having a valence of 3–4;

B) an inorganic phosphorus oxyacid compound containing a phosphorus atom with a valence of 5;

then add and mix

C) carbonization auxiliaries

D) carbonization accelerating compounds

G) heat reflecting substance

F) filler under conditions sufficient to prepare the organic phosphorus-inorganic phosphorus oxyacid compound.

In another aspect, according to this invention there is provided a flame retardant basic salt of organic phosphorus-inorganic phosphorus oxyacid compound produced by a process comprising of serially mixing and reacting:

A) organic phosphorus compound containing a phosphorus atom having a valence of 3–4;

B) inorganic phosphorus compound containing a phosphorus atom having a valence of 5; then mix and react;

C) basic salt forming compound thereby producing a basic salt of organic phosphorus-inorganic phosphorus oxyacid;

then add and mix

D) carbonization auxiliaries

E) carbonization accelerating compounds

F) filler under conditions sufficient to prepare the salt of organic phosphorus-inorganic phosphorus oxyacid.

In another aspect, according to this invention, there is provided a flame retardant thermoplastic resin composition which comprises (1) thermoplastic resin, (2) organic phosphorus-inorganic phosphorus oxyacid, (3) carbonization auxiliaries, (4) metal containing compound having a carbonization accelerating effect, (4) comb-like polymer and (5) filler.

The components may be utilized in any suitable amount but preferably:

1. Organic phosphorus compound, which contains a phosphorus atom containing a valence of 3–4, in the amount of 25 to 100 parts by weight;

2. Inorganic phosphorus oxyacid compound, which contains a phosphorus atom with a valence of 5, in the amount of 10 to 100 parts by weight;

3. An amount of 5% to 30% by weight of the flame retardant compound or it's basic salt or it's composition is added to or applied on the flammable organic material;

4. Basic salt forming compound in the amount of 0 to 100 parts by weight;

5. metal containing compound having a carbonization accelerating effect in the amount of 0 to 40 parts by weight;

6. Comb-like polymer, in the amount of 0 to 100 parts by weight
7. Heat reflecting compound, such as titanium oxide, in the amount of 0 to 30 parts by weight.
8. Filler, in the amount of 0 to 400 parts by weight.
9. Carbonization auxiliaries, 0–100 parts by weight.

Component A

Any suitable organic phosphorus-compound, that contains a phosphorus atom with a valence of 3–4, may be used in this invention, such as, but not limited to, organic phosphites, phosphonates, phosphate, hydrogen phosphites, hydrogen phosphates, polyphosphates, polyphosphonates, polyphosphites, phosphites-phosphates, phosphorus esters, polyphosphorus esters, acid phosphates, polyphosphonate esters, diphosphonic acid esters, phosphorus esters and phosphines, alkyl chlorophosphines and mixtures thereof. The organic phosphonate are the preferred organic phosphorus compound.

Suitable organic phosphates include alkyl phosphites, dialkyl phosphites, trialkyl phosphites, dialkyl hydrogen phosphite, diaryl phosphites, aryl-alkyl phosphites, triaryl phosphites, dialkyl-aryl phosphites, etc. Suitable organic phosphonates include dialkyl alkyl phosphonates, aryl-alkyl phosphonates, diaryl alkyl phosphonates, etc. Suitable organic phosphates include alkyl dihydrogen phosphates, dialkyl hydrogen phosphates, trialkyl phosphates, aryl dihydrogen phosphates, diaryl hydrogen phosphates, triaryl phosphates, aryl-dialkyl phosphate, diaryl alkyl phosphate, etc. Commercially available organic phosphorus compounds which contain a phosphorus atom with a valence of 3 or 4 such as those produced by "ALBRIGHT & WILSON which include ANTIBLAZE CU, a cyclic phosphonate ester, ANTIBLAZE N, a cyclic phosphonate ester, ANTIBLAZE V225, a mixture of alkyl and aryl phosphate esters, ANTIBLAZE V400, an organo phosphate/phosphonate, ANTIBLAZE V490, an organo phosphonate ester, ANTIBLAZE 1045, a cyclic diphosphate ester, ANTIBLAZE DMHP-HP, dimethyl hydrogen phosphite, ANTIBLAZE TEP-HP, triethyl phosphite", and other commercially available organic phosphorus compounds which contains phosphorus atoms with 3–4 valences.

Component B

Any suitable inorganic phosphorus oxyacid compound which contains a phosphorus atom with a valence of 5 may be used in this invention. Suitable inorganic phosphorus compounds include, but not limited to, phosphoric acid, polyphosphoric acid, pyrophosphoric acid, phosphorus oxide, salts of hydrogen phosphoric acid, phosphonic acid, ammonium hydrogen phosphate, ammonium polyphosphate, triphosphorus acid, phosphinic oxide, phosphorus esters, phosphorus trioxide, phosphorus pentioxide, metaphosphoric acid, phosphorus acid, hypophosphorus acid, and mixtures thereof. Phosphoric acid is the preferred inorganic phosphorus oxyacid.

Component C

An suitable salt forming compound that will react with an organic phosphorus compound or inorganic phosphorus compound may be used in this invention. Suitable salt forming compounds include, but not limited to, compounds containing alkali metals, alkaline earth metals, metals, and nitrogen containing compounds such as compounds containing ammonium radicals, ammonia, amines, amino compounds, polyamines, and aminoplasts, other nitrogen containing compounds and mixtures thereof. Alkylanolamine compounds are the preferred salt forming compounds, particularly ethanolamine. It is not always necessary to use basic salt forming compounds but when used it is utilized in the amount of 5–100 parts by weight.

Component D

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives may also be used for this purpose.

Phosphorus containing compounds, such as, boron-phosphates, phosphates, and polyphosphates of ammonia, amines, polyamines, amino compounds, thioureas and alkyanolamines, boric acid and its salts and their derivatives, organic phosphorus compounds and their salts, halogenated organic phosphorus compounds, their salts and their derivatives may also be used for this purpose. The carbonization auxiliaries and other flame retardant agents may be used in quantities of 0 to 100 parts by weight. In many compositions they are not necessary but when used, it is used in the amount of 5 to 100 parts by weight.

The nitrogen containing salts of phosphorus acids are the preferred carbonization compounds, such as amine phosphates, amine salts of organic phosphorus compounds, amino phosphate, amino salts of organic phosphorus compounds and amino condensation salt of inorganic and organic phosphorus compounds. The amino condensation salt of phosphorus compounds are produced by contacting the amino condensation compounds with phosphorus containing compound that will react with an amino compound, under conditions sufficient to prepare an amino condensate salt of a phosphorus containing compound. Suitable inorganic phosphorus compounds include, but not limited to phosphoric acid, pyrophosphoric acid, triphosphoric acid, metaphosphoric acid, phosphorous acid, hypophosphorous acid, phosphinic acid, phosphinous acid, phosphine oxide, phosphorus trihalides, phosphorus oxyhalides, phosphorus oxide, mono-metal hydrogen phosphates, ammonia dihydrogen phosphate, bromated phosphates, alkaline metal dihydrogen phosphate and halogenated phosphate-phosphite and their halides and acids. Organic phosphorus compounds include, but not limited to, alkyl, cyclic, aryl and alkyl-aryl phosphorus compounds, such as, alkylchlorophosphines, alkyl phosphines, alkyl phosphates, dialkyl hydrogen phosphates, dialkyl alkyl phosphonates, trialkyl phosphates, organic acid phosphates, organic phosphonate esters, aryl phosphates, aryl hydrogen phosphates, halogenated phosphonates esters and mixtures thereof, Amino condensation borates may be produced by contacting boric acid and amino condensation compound under conditions sufficient to prepare the amino condensation borates which may also be utilized and also ammonia borates may be used. Amino condensation boron-phosphates may be produced by contacting boron-phosphates and amino condensation compounds under conditions sufficient to prepare amino condensation boron-phosphate compounds which may also be utilized. The salt forming phosphorus containing compounds will react with the amino condensation compounds to form an amino condensation salt of a phosphorus containing compound which may also be used.

Component F

Any suitable filler may be used in this invention. The fillers that may be utilized in the flame retardant mixture are usually insoluble in the reaction mixtures. They may be Inorganic substances, such as, alkali metal silicates, alkaline earth metal silicates, metal silicates, silica, metals, metal oxides, carbonates, sulphates, phosphates and borates, Portland cement, grass beads, or hollow beads. Hydrated aluminum oxide is the preferred inorganic compound. They may be organic substances such as amino compounds, such as urea, melamine, dicyandiamide, and other cyanuric derivatives or their formaldehyde resins, aminophosphates, amino salts of organic phosphates, phenol-aldehyde resin powder, powdered coke, graphite, graphite compounds and mixtures thereof, The organic halide flame retardant compounds may also be added as filler.

Component H

Any suitable organic material which is more flammable than the organic phosphorus-inorganic phosphorus oxyacid compounds or their basic salts of this invention may be used in this invention. Any suitable plastic resin composition or mixtures thereof and any suitable natural organic material may be used in this invention and mixtures thereof. These materials may be in the form of a solid, cellular, suspension, emulsion or solution. Suitable plastic resin include, but not limited to, vinyl dienes, vinyl diene copolymers, polyesters, polyester resins, phenoplasts, aminoplasts, polyepoxy resins, polyurethane, furans, polyamides, polyimides, polycabonates, silicones, polyethers, thioplasts, polytetrafluoroethylene, polysulfones, urethane-epoxy resins, urethran silicate resins or foams, cellulose nitrates, regenerated cellulose, cellulose esters, cellulose ethers, cyanoethyl cellulose and mixtures thereof.

Suitable natural products include, but not limited to, wood, cellulose, lignin-cellulose, paper, cotton, wool, linen, dammars, copols, other natural resins, natural rubber, natural proteins, e.g., soya bean protein, silk, glues gelatin, etc., modified cellulose and mixtures thereof Any suitable isocyanate may be used in this invention, organic polyisocyanates are preferred. The commercial available ones are preferred such as tolylene-2,4-diisocyanate, tolylene-2,6-diisocyanate, polymethylene polyphenyl isocyanate, diphenylmethane 4,4'-diisocyanate, 3-methlydiphenyl-methane-4,4'-diisocyanate, m- and p-phenylenediisocyanante, polyphenylpolymethylene isocyanates obtained by phosgenation, commercially known as "crude MDI", modified polyisacyanates and mixtures thereof. Suitable organic polyisocyanates are exemplified by the organic diisocyanate which are compounds of the general formula

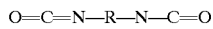

O=C=N—R—N—C=O wherein R is a divalent organic radical such as an alkylene, aralkylene or arylene radical. Such radical may contain 2 to 20 carbon atoms. Any suitable compound with active hydrogens may be reacted with the polyisocyanates to produce polyurethane products. The preferred compound with active hydrogens are polyols. Polyurethane catalyst, blowing agents, surfactants, foam stabilizers, dyestuff, plasticizers, propellant, desiccant and fillers may also be used. Polyisocyanate which has the formula

$Q(NCO)_m$ in which m represent a number from 2 to 4 and Q represents an aliphatic hydrocarbon radical having 2 to 18 C atoms, a cycloaliphatic hydrocarbon radical having 4 to 15 C atoms, an aromatic hydrocarbon radical having 6 to 15 C atoms, or araliphatic hydrocarbon radical having 8 to 15 C atoms and an organic compounds with 1 or more active hydrogens which will react with an isocyanate, containing a urethane catalyst, a plasticizer, propellants and a silicone surfactant may be used as the flammable organic material. Any suitable polyepoxy compounds may be used in this invention such as ally glycidyl ether, tert-butyl glycidyl ether and other polyepoxides.

Component (1)

Any suitable thermoplastic resin may be used in this invention. Suitable thermoplastic resins include the olefin polymers. The olefin polymers include, for example, homopolymers and copolymers of olefins such as ethylene, propylene, butene-1, pentene-1, hexene-1, heptene-1, octene-1 and the like and, specific samples thereof include polyethylene, polypropylene, ethylene-polypropylene copolymers, ethylene-butene-I copolymer ethylene-hexene-1 copolymers, and ethylene-octene-1 copolymers.

Said olefin polymers also include copolymers of said olefin with polar monomers comprising the olefin unit as the main constituent, specifically ethylene-vinyl acetate copolymer, ethylene-methymethacrylate copolymer, ethylene-acrylic acid copolymer, ethylene-vinyl alcohol copolymer and the like. These olefin polymers may be used alone or in combination of two or more. The thermoplastic resin in this invention includes homopolymers and copolymers of unsaturated carboxylic acids and their alkyl esters, such as acrylic acid, methacrylic acid, methylacrylate, methylmethacrylate, and the like, and vinyl esters of saturated carboxylic acids such as vinyl acetate, vinyl butrate and the like. These homopolymers and copolymers may be used alone or in combination of two or more.

Said vinyl aromatic polymers include, for example, homopolymer and coploymers of styrene monomers such as styrene, a-methylstyrene and vinyl styrene, and specific examples thereof polystyrene, poly-a-methylstyrenes, polyvinyltoluene, styrene-a-methylstyrene copolymers and the like. The vinyl aromatic polymers further include, for example, copolymers of styrene with acrylonitrile monomer, maleimide monomer, acrylic acid ester monomer, maleic acid monomer, and specific examples include styrene-acrylonitrile copolymer, styrene-butadiene-acrylonitrile copolymer, styrene-methylacrylate copolymer, styrene-maleic anhydride copolymer and the like.

Said vinyl aromatic polymers may also be modified with a rubbery polymer, and the rubbery polymer includes, for example, polybutadiene, styrene-butadiene copolymer, butadiene-acrylonitrile copolymer, ethylene-propylene-diene copolymer,butadiene-acrylic acid ester copolymer and the like. These vinyl aromatic polymers may be used alone or in combination of two or more.

Furthermore, the thermoplastic resin in this invention includes also engineering plastics such as polyphenylene ether, rubber-modified polyphenylene ether, polyethylene terephthalate, polybutylene terephthalate, polyamide, polycarbonate, polyacetal, polysulfone, polyethersulfone, polyphenyene sulfide, polyarylate, polyamide-imide, polyetheramide, polyetherketone, polyetheretherketone, polyimide and the like. The thermoplastic resins in this invention may also be chemically modified products, blends and alloyed products of the above-mentioned thermoplastic resins or may be reinforced with glass fiber or the like.

As the thermoplastic resin to be used in this invention, among the above-mentioned examples, particularly preferable in industry are those consisting of one or more olefin polymers mentioned above or those consisting of one or more vinyl aromatic polymers in view of the moldability and mechanical properties of a flame retardant resin composition prepared by mixing the thermoplastic resin with component (2), an organic phosphorus-inorganic phosphorus oxyacid compound or component (3), a salt of an organic phosphorus-inorganic oxyacid compound, component (4), a comb-like polymer, (5) a metal-containing compound having a carbonization accelerating effect, component (6), a carbonization auxiliary, and (7) a filler.

When halogen-containing resins, for example, polyvinyl chloride, polyvinyldiene chloride, chlorinated polyethylene, chlorosulfonated polyethylene and the like, are used as polymer of this invention, the flame retardant can be improved, but the halogen-containing resins become a source of generating a toxic gas due to the halogenelement contained therein when the resins are burned, and hence, are not the optimum resins to be used in this invention.

Component (2)

Component (2), a organic phosphorus-inorganic phosphorus oxyacid compounds which are produced by reaction component A, an organic phosphorus compound containing phosphorus which has a valence of 3 or 4, and component B, an inorganic phosphorus oxyacid compound containing phosphorus which has a valence of 5.

Component (3)

Component (3), salt of organic phosphorus-inorganic phosphorus oxyacids compounds are produced by the process of this invention as stated above, by reacting component A, an organic phosphorus compound and component B, an inorganic phosphorus compound, thereby producing an organic phosphorus-inorganic phosphorus oxyacid compound which is then reacted with component C, a salt forming compound. The preferred salt of an organic phosphorus-inorganic phosphorus oxyacid compounds to be use to flame retard thermoplastic resins are nitrogen containing salts of organic phosphorus-inorganic phosphorus oxyacid compounds. The preferred nitrogen containing compound is biuret or a combination of biuret and another amino compound and/or ammonia compound. The preferred organic phosphorus compounds are or organic phosphonate compounds, for example, phosphonicacid, methyl-,(5-ethyl-2methyl-1,2,3-dioxaphosphorinan-5-yl)methyl,methyl ester, P-oxide and phosphonic acid,ethyl-,bis(5-ethyl-2-methyl-1, 2,3-dioxaphosphorinan-5-yl)methyl]ester, P,P'dioxide.

Component (4)

A comb like polymer consisting of a polyethyene main chain and a polyoxyalkylene main chain and a polyoxyalkylene side chain can be obtained by, for example, graft-copolymerization of a cyclic ether such as ethylene oxide or propylene oxide to a saponification product of an ethylene-vinyl acetate copolymer, esterification between ethylene-vinyl acid copolymer and polyethylene glycol, polypropylene glycol or the like, copolymerization of ethylene with w-hydroxypolyethylene oxide macromonomer, or the like. As its production process, the disclosed in Japanese Patent Application is practicable which is a production process comprising heating an ethylene-vinyl acetate copolymer and an alcohol in the presence of an alkali catalyst to saponify them, removing the alcohol and then introducing alkylene oxide there into to form a graft copolymer.

Component (5)

A metal-containing compound having carbonization accelerating effect used in this invention increases the amount of carbonization residue after combustion, thereby enhancing the flame retarding effect. These compounds include, but not limited to, alkaline earth metal borates such as magnesium borate, calcium magnesium borate, manganese borate, zinc borate and the like, metal oxides such as titanium oxide, tin oxide, nickel oxide, zinc oxide and the like, ferrocene, dimethylglyoxime copper, acetyl-acetonatocopper, hydroxyquinoline nickel and the like, zinc thiocarbamate compounds such as zinc dimethylthio-carbamate, zinc di-n-butyldithiocarbamate and the like, mercaptobenzothiazole zinc compounds such as mercaptoben-zothiazole zinc and the like, salicylaldehyde zinc compounds such as salicylaldehyde zinc and the like, metal hydroxides such as aluminum hydroxide, magnesium hydroxide, calcium magnesium hydroxide, zirconium hydroxide and the like.

The most preferable compounds are selected from zinc oxide, the zinc thiocarbamate compounds, the mercaptoben-zothiazole zinc compounds, the salicyaldehyde zinc compounds, zinc borate and the alkaline earth metal borates.

DETAIL DESCRIPTION OF THE INVENTION

The components are mixed and reacted under conditions sufficient to prepare the organic phosphorus-inorganic phosphorus oxyacid compounds and/or composition and flame retarded organic materials. Many of the reactions will take place at ambient temperature and pressure. Most of the reactions are exotherinc and may require cooling. Some of the reactions may be speeded up by using an elevated temperature of 100° to 300° C. and pressure. When a gas is used it may be necessary to use increased pressure to compress the gas in order to form a liquid.

It is preferred for the organic phosphorus compound to contain a phosphorus atom which has a valence of 3 so that the phosphorus atom will have 2 remaining valences to react with the inorganic phosphorus oxyacid compound which contain a phosphorus atom which has a valence of 5. The inorganic phosphorus oxyacid had active hydrogens to react with the 2 free valences of the organic phosphorus compound. The organophosphorus compounds with a coordination number of four ("pentavalent" phosphorus compounds) such as esters of phosphonic acid will also react with inorganic phosphorus oxyacid compounds. The organic phosphates has an active oxygen on the phosphorus atom which will react with the inorganic phosphorus oxyacid compounds. The organic phosphorus-inorganic phosphorus oxyacid compounds may be produced as a neutral, mildly acidic or moderate acidic compounds. Phosphoric acid will react with organic phosphonates to form compounds such as:

1) equals mols of organic phosphonate and phosphoric acid are reacted to produce

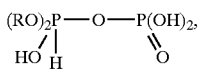

2) two mols of organic phosphonate are reacted with one mol of phosphoric acid to produce

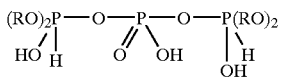

3) One mol of organic phosphonate is reacted with two mols of phosphoric acid to produce

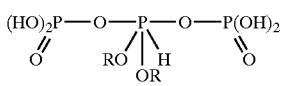

Organic phosphites will react with phosphoric acid to produce organic phosphorus-inorganic phosphorus oxyacids such as:
1) equal mols of an organic phosphite is reacted with phosphoric acid thereby producing:

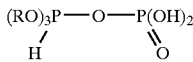

2) two mols of an organic phosphite are reacted with one mol of phosphoric acid thereby producing:

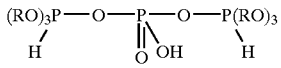

3) two mols of phosphoric acid are reacted with one mol of organic phosphite thereby producing:

Organic phosphates will react with phosphoric acid to produce organic phosphorus-inorganic phosphorus oxyacid compounds such as:
1) equal mols of an organic phosphate and phosphoric acid are reacted to produce;

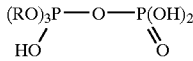

2) two mols of an organic phosphate and one mol of phosphoric acid are reacted to produce;

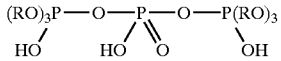

Organic esters of acids of trivalent phosphorus or phosphorus with a coordination valence of four will react with phosphoric acid to produce organic phoshorus-phosphorus oxyacids compounds such as:
1) equal mols of a phosphonic ester and phosphoric acid are reacted to produce organic phosphorus-phosphorus oxyacid compounds such as

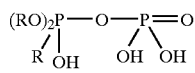

2) two mols of a phosphonic ester and one mol of phosphoric acid are reacted to produce organic phosphorus-phosphorus oxyacid compounds such as;

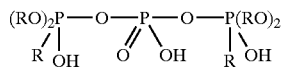

3) two mols of phosphoric acid and one mol of phosphonic ester are reacted to produce organic phosphorus-phosphorus oxyacid compounds such as;

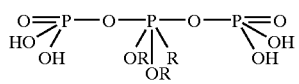

Wherein R is an alkyl, aryl, alkyl-aryl, cyclic, dialkyl alkyl, hydrogen or other organic radicals or mixture thereof.

The salt of organic phosphorus-inorganic phosphorus oxyacid compounds are usually produced by mixing and reacting the organic phosphorus compound with the inorganic phosphorus oxyacid compound to produce an organic phosphorus-inorganic phosphorus oxyacid compound, and then the basic salt forming compound is added and reacted thereby producing a salt of organic phosphorus-inorganic phosphorus oxyacid compound. These reactions are usually exothermic but in some reactions it is necessary to heat the mixture up to 300° C. Then the comb-like polymer, carbonization auxiliaries, carbonization accelerators and fillers are added and mixed with the salt of organic phosphorus-inorganic phosphorus oxyacid compound to form a flame retardant composition. The flame retardant salt of organic phosphorus-inorganic oxyacid compound and/or the flame retardant composition is added on or mixed in the more flammable organic material.

In this invention, the method of mixing the thermoplastic resin, the organic phosphorus-inorganic phosphorus oxyacid compound, salt of organic phosphorus-inorganic phosphorus oxyacid compound and/or composition, comb-like polymer consisting of a polyethylene main chain and a polyoxyalkylene side chain and a metal-containing compound having a carbonization accelerating effect is not critical. All the above components, thermoplastic resin, organic phosphorus-inorganic phosphorus oxyacid compound and/or composition, salt of organic inorganic phosphorus-inorganic phosphorus oxyacid and/or composition, comb-like polymer, carbonization auxiliaries and metal containing compound may added simultaneously then mixed together by any suitable means. They may be mixed together by using a Banbury mixer, an open roller, a kneader, a single or multiple screw extruder or the like with or without or after mixing by a Henschel mixer, a tumbler mixer or the like. The said mixture is heated until the thermoplastic resin softens or melts, then is thoroughly mixed, then extruded or molded into a desired shape. The organic phosphorus-inorganic phosphorus oxyacid compound and basic salt forming compound may be may be added separate with the thermoplastic resin, and are reacted when the mixture is heated.

The flame retardant thermoplastic composition of this invention may if necessary, have added thereto a heat stabilizer, an antioxidant, a light stabilizer, a lubricant, an antifogging agent, a pigment, a blowing agent, a fluorescent agent, a release agent, a processing aid, a reinforcing agent, and the like which are generally added to a thermoplastic resin, depending upon the uses of the composition. A known flame-retardant such as a halogen-containing flame retardant, an inorganic flame retardant or the like may also be added to the thermoplastic resin.

DESCRIPTION OF THE PREFERRED EMBODIMENT

The following examples which describe certain preferred embodiment of the processes may, of course, be varied as described above with similar results. This invention is not limited to the examples below. Parts and percentages are by weight unless otherwise indicated.

The following Reference Examples shows method for producing the organic phosphorus-inorganic phosphorus oxyacid compounds and composition, basic salt of organic phosphorus-inorganic phosphorus oxyacid compounds and compositions, and the comb-like polymer consisting of a polyethylene main chain and a polyoxyalkylene side chain.

REFERENCE EXAMPLES

Example 1

50 parts by weight of dimethyl methyl phosphonate and 50 parts by weight of phosphoric acid are mixed. The reaction is exothermic and is completed within 30 minutes to 1 hour thereby producing a dimethyl methylphosphonate-phosphoric acid compound. The chemical reaction may be enhanced by keeping the temperature of the mixture just below the boiling point of the reactants.

Example 2

25 parts by weight of dimethyl hydrogen phosphite and 25 parts by weight of phosphoric acid are mixed and reacted. The reaction is exothermic and is completed within 30 minutes to 1 hour, thereby producing a dimethyl hydrogen phosphite-phosphoric acid compound. The chemical reaction may be speeded up by keeping the temperature of the mixture just below the boiling point of the reactants.

Example 3

100 parts by weight of diethyl hydrogen phosphite and 50 parts by weight of phosphoric acid are mixed and reacted. The reaction is exothermic and the temperature of the reactants are keep below their boiling point for 30 minutes to 1 hour thereby producing a diethyl hydrogen-phosphoric acid compound.

Example 4

Example 1 is modified where 25 parts by weight of phosphoric acid is used instead of 50 parts by weight.

Example 5

Example 1 is modified wherein 75 parts by weight of phosphoric acid is used instead of 50 parts by weight.

Example 6

Example 1 is modified wherein another organic phosphorus compound is used in place of dimethyl methyl phosphonate thereby producing an organic phosphorus-inorganic phosphorus oxyacid compound and selected from the list below:

a) trimethyl phosphate
b) dimethyl hydrogen phosphate
c) diethyl hydrogen phosphate
d) triethyl phosphate
e) triisopropyl phosphate
f) diisopropyl hydrogen phosphate
g) tributyl phosphate
h) dibutyl hydrogen phosphate
i) bis(2-ethylhexyl)hydrogen phosphate
j) triisooctyl phosphate
k) tris(2-chloroethyl)phosphate
l) dilauryl hydrogen phosphate
m) dilauryl hydrogen phosphate
n) dioleyl hydrogen phosphate
o) and mixtures thereof

Example 7

Example 2 is modified wherein an organic phosphorus compound is used in place of the dimethyl hydrogen phosphite thereby producing an organic phosphorus-inorganic phosphorus oxyacid compound and selected from the list below:

a) trimethyl phosphate
b) dimethyl hydrogen phosphate
c) triethyl phosphate
d) diethyl hydrogen phosphate
e) triisoproply phosphate
f) diisopropyl hydrogen phosphate
g) tributyl phosphate
h) dibutyl hydrogen phosphate
i) tributylethyl phosphate
j) diphenyl hydrogen phosphate
k) diisooctyl hydrogen phosphate
l) di(2-ethylhexyl)hydrogen phosphate
m) octophenyl hydrogen phosphate
n) alkylchlorophosphines
o) and mixtures of the above,

Example 8

Example 1 is modified wherein an organic phosphonate compound is used in place of the dimethyl methyl phosphonate thereby producing and organic phosphonate-inorganic phosphorus oxyacid compound and selected from the list below:

a) dimethy methyl phosphonate
b) diethyl ethyl phosphonate
c) cyclic phosphonate (ANT BLAZE 1045 by Albright& Wilson Americas)
d) dibutyl buty phosphonate
e) bis(2-ethylhexyl)2-ethylhexyl phosphonate
f) bis(2-choloethyl)2-chloroethyl
g) and mixtures thereof phosphonate

Example 9

Example 1 is modified wherein an inorganic phosphorus oxyacid compound is used in place of phosphoric acid and selected from the list below;

a) polyphosphoric acid
b) pyrophosphoric acid c) triphosphorus acid
d) metaphosphoric acid
a) phosphorus acid
f) hypophosphorus acid
g) phosphinic acid
h) phosphinous acid
i) phosphine oxide
j) phosphorus oxychloride
k) phosphorus trichloride
l) phosphorus oxide
in) mono-aluminum phosphate
n) ammonium hydrogen phosphate
a) ammonium polyphosphate
p) boron hydrogen phosphate
q) boron polyphosphate
r) phosphorus trioxide
s) phosphorus pentaoxide
t) phosphorus thiochloride
u) and mixtures of the above.

Example 10

Example 1 is modified wherein equal mols of the organic phosphorus-inorganic phosphorus oxyacid compounds is reacted with equal mols of a basic salt forming compound to produce a basic salt of organic phosphorus-phosphorus oxyacid and the basic salt is selected from the list below:
 a) urea
 b) thiourea
 c) ammonia
 d) methyl urea
 e) ammoniun, carbonate
 f) ammonium bicarbonate
 g) dicyandiamide
 h) guanidine
 i) aminoguanidine
 j) methyl amine
 k) propylene diamine
 l) diethylenetriamine
 m) aluminum hydroxide
 n) magnesium hydroxide
 o) boric oxide
 p) ammonium borate
 q) urea borate
 r) biuret
 s) isocyanuric acid
 t) hydrolyzed biuret
 u) urea condensate
 v) urea melamine condensate
 w) ethanolamine
 x) and mixture of the above.

Example 11

100 gms of dimethyl hydrogen phosphate and 25 gms of phosphorus oxytrihalide are mixed and reacted then 15 gms of ethyl alcohol are added and reacted. Cl and HCI evolves from the mixture. After the reaction is completed 50 gms of phosphoric acid is added and reacted at ambient temperature and pressure for 30 minutes thereby producing an organic phosphorus-inorganic phosphorus oxyacid compound.

Example 12

50 parts by weight of triethyl phosphate and 25 parts by weight of phosphoric acid are mixed and keep at a temperature just below the boiling point of the reactants for one hour thereby producing an organic phosphorus-inorganic phosphorus oxyacid compound, triethyl phosphate-phosphorus oxyacid-triethyl phosphate.

Example 13

Example 12 is modified wherein another organic phosphorus compound is used in place of triethyl phosphate thereby producing an organic phosphorus-inorganic phosphorus oxyacid compound and selected from the list below:
 a) dimethyl methyl phosphonate
 b) trimethyl phosphate
 c) diethyl ethyl phosphonate
 d) tripropyl phosphate
 e) bis( 2-ethylhexyl)phosphonate
 f) 2-ethylhexyl phosphonate
 g) diethyl hydrogen phosphite
 h) triethyl phosphite
 i) triisopropyl phosphite
 j) butyl acid phosphate
 k) phenyl acid phosphite
 m) triethylhexyl phosphate
 n) triethyl phosphite
 o) diethyl hydrogen phosphite
 p) dimethyl ethyl phosphonate
 q) dipropyl ethyl phosphate
 r) methylchlorophosphine
 s) and mixtures thereof

Example 14

Example 12 is modified wherein another inorganic phosphorus oxyacid is used in place of phosphoric acid and selected from the list below:
 a) pyrophosphoric acid
 b) triphosphoric acid
 c) polyphosphoric acid
 d) phosphinic acid
 e) phosphorus acid
 f) phosphinous acid
 g) phosphine oxide
 h) phosphorus oxide
 i) ammonium phosphate
 j) mono-aluminum phosphate
 k) mono-magnesium phosphate
 l) boron polyphosphoric acid condensation
 p) and mixtures thereof

Example 15

Example 12 is modified wherein equal mols of a salt forming nitrogen containing compound is reacted with equal mols of the organic phosphorus-phosphorus oxyacid compound at ambient temperature and selected from the list below:
 a) urea
 b) thiourea
 c) methyl urea d) biuret
e) hydrolyzed biuret
f) isocyanuric acid
g) hydrolyzed isocyanuric acid
h) dicyandimide
i) dimelamine phosphate
j) melamine borate
k) guanidine
l) aminoguanidine
m) ammonium carbonate
n) guanidine carbonate
a) melamine borate
p) ethylene diamine
q) diethylenetriamine
r) ammonia
s) ethyl isocyanate
t) acetoamide
u) urea melamine condensate
v) hydrolyzed urea melamine condensation
w) and mixtures of the above.

Example 16

100 parts by weight of unsaturated polyester resin, 0.5 part by weight of organic peroxide and 15 parts by weight the dimethyl methyl phosphonate-inorganic phosphoric acid compound produced in Example 1 are mixed then poured into a mold to produce a ⅛"×6"×6" sample. The sample is cured for one week then cut in ½" wide strips. These strips are tested by placing the strips in a vertical position then applying a 4" blue flame from a Bunsen burner under the strip with the flame hitting the strip. The flame is applied for 10 seconds and if not burning it is applied for another 10 seconds. The strip did not catch on fire after the flame was applied for 20 seconds.

Example 17

Example 16 was modified wherein 300 parts by weight of Portland cement containing 15%–25% water was added to the unsaturated polyester resin thereby producing a flame retardant polyester concrete. The sample was tested as in Example 16 and did not catch on fire.

Example 18

50 parts by weight of polymeric MDI (Mondur MR by Mobay), 50 parts by weight of sucrose polyol , (Olin No. 475), containing 1% foam regulator (L5420 by Union Carbide), 025 part by weight of a tin polyurethane catalyst (TI2 by Air Products), an amine catalyst (Polycat R 8020 by Air Products) and 4 parts by weight of water, and 20 parts by weight of dimmethyl methyl phosphonate-inorganic phosphoric acid compound produced in Example 1 are mixed then poured into a mold. The mixture foams into a rigid flame retarded polyurethane foam of about 2 lbs. per cubic foot. The foam is cured for 1 week then flame tested using a ½"×2"×6" sample which is placed vertically on a frame, then a Bunsen burner with a 2" high blue flame is placed under the foam sample. The flame applied for 20 seconds as in UL 94 VO. The flame went out as soon as the Bunsen burner was removed. The melted plastic did not bum.

Example 19

15 parts by weight of biuret salt of organic phosphorus-phosphorus oxyacid compound of Example 15b, 15 parts by weight of a polyol component with urethane catalyst (Pro-Design B by 3M), and 30 parts by weight of MDI prepolymer (Pro-Design A by 3M) are mixed and poured into a molds thereby forming solid flame retardant polyurethane samples, ⅛"×2"×6". These samples were cured for 1 week then flame tested using a 4" Bunsen burner flame which was placed at the bottom of a vertical sample for 1 minute. The flame went out as soon as the Bunsen burner was removed. There was about a 2% weight loss.

Example 20

100 parts by weight of ethylene modified polypropylene glycol (MULTRANOL 7056 by Miles), 30 parts by weight of dimethyl hydrogen phosphite-inorganic phosphoric acid compound of Example 2, 1 part by weight of silicone surfactant (L6202 by Union Carbide), 3 parts by weight of water, 0,5 weight of amine catalyst (polycat 33L by Air Products), 0.025 parts by weight of tin catalyst (Tl 2 by Air Products) and 50 parts by weight of TDI (MONDUR TD80) are mixed then poured into a mold thereby producing a flame retardant flexible polyurethane foam. The faom was cured for 1 week, then flame tested by using ½"×2"" samples hung vertically. A 4" Bunsen burner blue flame was placed under the foam for 1 minute. The flames did not spread and the melted drippings did not bum. The flexible foam was also flame tested by the method of Calif TB 133 test and it passed the test because there was only a weight loss of 52 gms.

Example 21

Example 21 is modified wherein another polyisacyanate is used in place of TDI and selected from the list below:
a) polymeric MDI (MONDUR MR by Miles)
b) polymeric MDI (PAPI 27 Dow)
c) Polymeric MDI (MONDUR MRS)
d) MDI

Example 22

30 parts by weight of the diethyl hydrogen phosphite-phosphoric acid compound of Example 3, 70 parts by weight of a flexible polyepoxy resin (EPON R 828 by Shell) and 8 parts by weight of diamine (Ancamine by Air Products) are mixed then poured into a ⅛"×6"×6" mold and cured. After 1 week the sample is cut into ½" strips then flame tested by using a Bunsen burner with a 4" blue flame. The strips were hung vertically then the 4" Bunsen burner flame was placed at the bottom of the strip for 1 minute. After the flame was removed the flame went out. There was about a 2% weight loss.

Example 23

30 parts by weight of polyethylene pellets and 5 parts by weight of biuret salt of dimethyl methyl phosphonate-phosphoric acid compound produced by the process of Example 15d, are mixed then heated until the polyethylene is capable of being melt-kneaded, usually in the range of 200'–300' C., The mixture is melt-kneaded until the flame retardant is thoroughly mix in the plastic, The plastic is then pressed into mold to obtain a sample of 1/16" to ⅛" thick. The sample is cut into ½" strips and flame tested by the method of UL 94 VO. The samples were placed vertically then a 4" blue flame from a Bunsen burner was placed at a 20 degree angle under the sample for two periods of 10 seconds. When the flame was removed the flame went out and the drippings did not catch on fire, The samples had good physical properties.

Example 24

Example 23 was modified wherein another thermoplastic resin was used in place of polyethylene and selected from the list below and flame tested as in Example 22 with the same results:
 a) polypropylene
 b) polyvinyl acetate
 c) polystyrene
 d) polyamide(nylon)
 a) ethylene-vinyl acetate copolymer
 f) ethylene-propylene copolymer
 g) polyester resin
 h) ethylene-acrylic copolymer
 i) ethylene-vinyl acetate copolymer
 j) ethylene-vinyl alcohol copolymer
 k) adipic acid-vinyl acetate copolymer
 l) polyvinyl toluene
 m) styrene-acrylonitrile copolymer
 n) styrene-butadiene copolymer
 o) polybutadiene
 p) styrene-methyl methacrylate copolymer
 q) acrylonitrile-butadiene-styrene copolymer
 r) polycarbonate
 s) polysulfone
 t) polyphenyl ether
 u) polybutylene terephthalate
 v) ethylene-propylene copolymer
 w) polymethyl methacrylate
 x) polyvinyl chloride
 y) styrene-maleic anhydride copolymer
 z) and mixtures of the above.

Example 25

Example 23 is modified wherein an organic phosphorus-phosphorus oxyacid compounds is used in place of biuret salt of dimethyl methyl phosphonate-phosphoric acid and selected from the list below:
 a) dimethyl methyl phosphonate-phosphoric acid
 b) diethyl hydrogen phosphite-phosphoric acid
 c) triethyl phosphate-phosphoric acid
 d) triethyl phosphate-phosphoric acid
 e) cyclic phosphonate ester (Antiblaze N by Albright & Wilson)-phosphoric acid
 f) cyclic phosphonate ester (Antiblaze 1045 by Albright & Wilson)-phosphoric acid
 g) trimethyl phosphite-triphosphoric acid
 h) tripropyl phosphate-polyphosphoric acid
 i) tris(2-chloropropyl)phosphate-phosphoric acid
 j) tricresyl phosphate-phosphoric acid
 k) diethyl hydrogen phosphite-phosphorus pentaoxide
 l) dibutyl hydrogen phosphite-pyrophosphoric acid
 m) diisopropyl hydrogen phosphite-metaphosphoric acid
 n) di(dimethyl methyl phosphonate)-phosphoric acid
 o) and mixtures of the above.

Example 26

Examples 23, 24 and 25 are modified wherein carbonization auxiliaries are added in the amount of 3 parts by weight, and selected from the list below.
 a) ammonium polyphosphate
 b) melamine polyphosphate
 c) melamine borate
 d) melamine phosphate
 a) dimelamine phosphate
 f) urea phosphate
 g) urea polyphosphate
 h) boron polyphosphate condensation
 i) urea-melaminephosphate
 j) dicyandiamide phosphate
 k) dimethyl hydrogen phosphate
 l) hydrolyzed buiret phosphate
 m) biuret phosphate
 n) guanidine phosphate
 o) sulfamic acid
 p) ammonium sulfate
 q) ethylamine phosphate
 r) boric oxide
 s) methyl carbamate phosphate
 t) cyanoguanidine phosphate
 u) phosphorus oxide
 v) diethylenetriamine phosphate
 w) urea-melamine phosphate
 x) hydrolyzed urea phosphate
 y) isocyanuric phosphate
 z) and mixtures of the above.

Example 27

Examples 23,24 and are modified wherein 1 part by weight of a metal-containing compound having a carbonization accelerating effect compound is added with the components and selected from the list below:
 a) zinc borate
 b) zinc oxide
 c) zinc thiocarbamate
 d) calcium borate
 a) ferricene
 f) aluminum hydroxide
 g) magnesium hydroxide
 h) salicylaldehyde zinc
 i) calcium magnesium hydroxide
 j) titanium oxide
 k) manganese borate
 l) tin oxide
 m) nickel oxide
 n) mercaptobenzothiazole zinc
 o) and mixtures of the above.

Example 28

Examples 23, 24 and 25 are modified wherein 1 part by weight of a comb-like polymer comprising the polyethylene main chain and polyoxyalkylene side chain is added to the components.

Example 29

10 parts by weight of phosphoric acid and 30 parts by weight of cyclic phosphonate esters (ANTIBLAZE 1045 by Albright & Wilson Americas) are added, mixed and reacted thereby producing a cyclic phosphonate ester-phosphoric acid compound, which is then mixture with 300 parts by weight of polyethylene pellets, then heated to the melting point of the polyethylene. The components are melt-kneaded until they are thoroughly mixed, then pressed into a mold producing samples of 1/16" to 1/8" thick. The samples are cut into 1/2" strip then flame tested. They are hung in a vertical position, then a 4" blue flame of a Bunsen burner is placed under the samples with the flame hitting the samples. The flame is left on the bottom of the samples for 10 seconds, then another 10 seconds. The samples did not burn after the flame was removed. The melted plastic did not catch on fire.

Example 30

20 parts by weight of diethyl hydrogen phosphite and 10 parts by weight of phosphoric acid are mixed and reacted at ambient temperature for 30 minutes thereby producing diethyl hydrogen phosphite-phosphoric acid compound. This compounds and 200 parts by weight of polypropylene pellets are mixed the heated to about 200° to 250° C. The component are melt-kneaded until they are thoroughly mixed, then pressed into a mold producing samples of 1/6" to 1/8" thick. The samples are cut into 1/2" strips then flame tested while in a vertical position. A 4" blue flame of a Bunsen burner is placed on the bottom of the sample for two 10 seconds periods. The samples did not catch on fire. The melted drippings did not catch on fire,

Example 31

Example 30 is modified wherein 5 parts by weight of melamine added and reacted with the diethyl hydrogen phosphite-phosphoric acid, then cooled and pulverized into a powder, then added to the polypropylene pellets.

Example 32

Example 30 is modified wherein 3 parts by weight of zinc borate, 5 parts by weight of ammonium polyphosphorate and 3 parts by weight of a comb-like polymer consisting of a polyethylene main chain and a polyoxyalkylene side chain are added to the polyproplene pellets.

Example 33

Example 30 is modified wherein another thermoplastic resin is used in place of polyproplylene and selected from the list below:
a) polyethylene
b) nylon (polyamide)
c) polyvinyl acetate
d) ethylene-vinyl acetate copolymer
a) polyester resin
f) polyvinylidene chloride
g) polyurethane resin
h) polyurethane-epoxy resin
l) polystyrene
j) polymethylstyrene
k) styrene-acrylonitrile cop6lymer
l) polymethacrylate
m) polycarbonate
n) polyestersulfone
o) butadiene acrylonitrile copolymer
p) polyethylene terephthalate
q) butylene terrephthalate resin
r) styrene-maleic anhydride copolymer
s) polyacetal resin
t) ethylene-propylene-vinyl acetate copolymer
u) silicone resin
v) acrylic acid-methacrylic copolymer
w) polybutylene
x) phenol-aldehyde resin
y) polyimide
z) and mixtures of the above

Example 34

20 parts by weight of dimethyl methyl phosphonate-phosphoric acid of Example 1 and 100 parts by weight of styrene monomer containing a free-radical catalyst system are mixed, and reacted thereby producing a flame retardant polystyrene resin. The flame retardant polystyrene resin was molded into 1/6" to 1/8" samples then cut into 1/2" strips. These strips were placed vertically in a holder, then flame tested with a 4" blue flame from a Bunsen burner for two 10 seconds periods, and the samples did not catch on fire.

Example 35

Example 33 is modified wherein another vinyl monomer is used in place of styrene monomer and selected from the list below:
a) acrylonitrile
b) acrylic acid
c) methacrylic acid
d) methyl methacrylate
e) methacrylate
f) and mixtures thereof

I claim:
1. A flame retardant composition comprising a flammable organic material selected from the group consisting of plastic resins, natural products and mixtures thereof having incorporated a flame retardant amount of:
A) an organic phosphorus-phosphorus oxyacid compound produced by the process consisting of mixing, heating and reacting at ambient pressure the following components in stoichiometric proportion:
a) organic phosphorus compound with a valence of 3–4 and selected from the group consisting of organic phosphonates, phosphites, phosphates, alkyl hydrogen phosphites, alkyl-aryl hydrogen phosphites, acid phosphates and mixtures thereof, in the amount of 25 to 100 parts by weight;
b) inorganic phosphorus oxyacid which has a valence of 5 contains and selected from the group consisting of phosphoric acid, polyphosphoric acid, pyrophosphoric acid, triphosphoric acid, metaphosphoric acid, phosphorus oxide and mixtures thereof in the amount of 10 to 100 parts by weight;
then add, mix and react
c) basic salt forming compound, in the amount of 0 to 200 parts by weight;
then add and mix
B) a comb polymer consisting of polyethylene main chain and a polyoxyalkylene side chain, in the amount of 0 to 30 parts by weight;
C) a metal containing compound having a carbonization accelerating effect, in the amount of 0 to 30 parts by weight;
D) a carbonization auxiliaries selected from the group consisting of phosphorus, boron-phosphorus and boron containing compounds that produce acidic components in the pyrolysis mixture 0 to 100 parts by weight;

E) a filler, in the amount of 0 to 400 parts by weight; the components A–E being 5 to 50% by weight, based on the weight of the flammable organic material.

2. The flame retardant composition of claim 1 wherein the inorganic phosphorus oxyacid compound that has a valence of 5 is selected from the group consisting of phosphoric acid, polyphosphoric acid, pyrophosphoric acid, triphosphoric acid, metaphosphoric acid, phosphorus oxide and mixtures thereof.

3. The flame retardant composition of claim 1, wherein the comb polymer consisting of a polyethylene main chain and a polyoxyalkylene side chain is a compound obtained by graft-copolymerizing 50 to 800 parts by weight of ethylene oxide onto 100 parts by weight of a saponification product of an ethylene-vinyl acetate copolymer having a number average molecular weight of 1,000 to 10,000 and a vinyl acetate content of 4 to 49% by weight, in the amount of 0 to 30 parts by weight.

4. The flame retardant composition of claim 1 wherein the carbonization auxiliaries are selected from the group consisting of phosphorus containing compounds, boron containing compounds, boron-phosphorus containing compounds that produce acidic components in the pyrolysis mixture, in an amount of 0 to 100 parts by weight.

5. The flame retardant composition of claim 1 wherein the metal-containing compound having a carbonization accelerating effect is selected from the group consisting of zinc oxide, zinc thiocarbamate compounds, mercaptobenzothiazole zinc compounds, salicylaldehyde zinc compounds, zinc borate, alkaline earth metal borates and mixtures of the above.

6. The flame retardant composition of claim 1 wherein the basic salt forming compounds is selected from the group consisting of ammonia, amino compounds, amines, polyamines, polyamides, alkali metal oxides, hydroxides and carbonates, alkaline earth metal oxides, hydroxides and carbonates, metal oxides, hydroxides and carbonates, metals and mixtures thereof.

7. The flame retardant composition of claim 1 wherein the filler is selected from the group consisting of amino compounds, amino phosphates, aminoplasts, phenoplasts, ammonia phosphate, ammonia polyphosphate, powdered synthetic resins, sawdust, carbohydrates, bituminous addatives, graphite, graphite compound, cyanuric derivatives or their formaldehyde resins, powdered coke, silica, alkali metal silicates, alkaline earth metal silicates, metals, metal silicates, oxides, carbonates, sulphates, phosphates and borates, glass beads, hollow glass beads, hydrated aluminum oxide, Portland cement and mixtures thereof, in the amount of 0 to 400 parts by weight.

8. A flame retardant thermoplastic resin composition which comprises:

1) a thermoplastic resin, in the amount of 100 to 200 parts by weight;
2) an organic phosphorus-inorganic phosphorus oxyacid, in the amount of 5 to 50 parts by weight and produced by the process consisting of mixing, heating and reacting at ambient pressure, in stoichiometric proportions, the following components:
    a) an organic phosphorus compound containing phosphorus atom with valence of 3–4, and selected from the group consisting of organic phosphonates, phosphites, phosphates, alkyl hydrogen phosphites, alkyl-aryl hydrogen phosphites, acid phosphates and mixtures thereof,
    b) an inorganic phosphorus oxyacid compound selected from the group consisting of phosphoric acid, polyphosphoric acid, pyrophosphoric acid, triphosphoric acid, metaphosphoric acid, phosphorus oxide and mixtures thereof, containing phosphorus atom with valence of 5;
    then add and react
3) basic salt forming compound, in the amount of 0 to 100 parts by weight;
    then add and mix
4) a comb polymer consisting of a polyethylene main chain and a polyoxyalkylene side chain, in the amount of 0 to 30 parts by weight;
5) carbonization auxiliaries selected from the group consisting of phosphorus, phosphorus-boron and boron containing compounds that produce acidic compounds in the pyrolysis mixture, in the amount of 0 to 100 parts by weight;
6) metal-containing compound having a carbonization accelerating effect, in the amount of 0 to 30 parts by weight.

9. The flame retardant thermoplastic resin according to claim 8, wherein the thermoplastic resin is a thermoplastic resin consisting of at least one olefin polymer.

10. The flame retardant resin composition according to claim 8, herein the thermoplastic resin is a thermoplastic resin consisting of at least one vinyl aromatic polymer.

11. A process for producing a flame retardant composition of claim 1 which comprises mixing the following components with a flammable organic material:

A) organic phosphorus compound containing phosphorus atom with valence of 3–4, and selected from the group consisting of organic phosphonates, phosphites, phosphates, alkyl hydrogen phosphites, aryl-aryl hydrogen phosphites, acid phosphates and mixtures thereof, in the amount of 25 to 100 parts by weight;
B) inorganic phosphorus oxyacid compound containing phosphorus atom with valence of 5, selected from the group consisting of phosphoric acid, polyphosphoric acid, pyrophosphoric acid, triphosphoric acid, metaphosphoric acid, phosphorus oxide and mixtures thereof, in the amount of 10 to 100 parts by weight;
    are mixed, heated and reacted at ambient pressure, in stoichiometric proportions,
    then add and react
C) basic salt forming compound, in the amount of 0 to 100 parts by weight;
    then add and mix
D) carbonization auxiliaries selected from the group consisting of phosphorus, phosphorus-boron and boron containing compounds that produce acidic compounds in the pyrolysis mixture, the amount of 0 to 100 parts by weight;
E) metal-containing compound having a carbonization accelerating effect, in the amount of 0 to 30 parts by weight;
F) filler, in the amount of 0 to 400 parts by weight;
G) heat reflecting agent, in the amount of 0 to 30 parts by weight;
Components A and B are first reacted, thereby producing an organic phosphorus-inorganic phosphorus oxyacid compound, then component C is added and reacted, thereby producing a basic salt of organic phosphorus-inorganic phosphorus oxyacid compound, then components D, E, F and G are added and mixed thereby producing a flame retardant composition.

12. A process for producing a flame retardant thermoplastic resin composition of claim 1 which comprises mixing the following components:
1) a thermoplastic resin in the amount of 100 to 200 parts by weight;
2) an organic phosphorus-inorganic phosphorus oxyacid, in the amount of 50 to 100 parts by weight, produced by the process consisting of mixing, heating and reacting at ambient pressure, in stoichiometric proportion, the following components:
   A) organic phosphorus compound containing phosphorus atom with valence of 3–4, selected from the group consisting of organic phosphonates, phosphites, phosphates, alkyl hydrogen phosphites, alkyl-aryl hydrogen phosphites, acid phosphates and mixtures thereof, in the amount of 25 to 100 parts by weight;
   B) inorganic phosphorus oxyacid compound containing phosphorus atom with valence of 5, and selected from the group consisting of phosphoric acid, polyphosphoric acid, pyrophosphoric acid, triphosphoric acid, metaphosphoric acid, phosphorus oxide and mixtures thereof, in the amount of 10 to 100 parts by weight;
   then add and react
   C) basic salt forming compound, in the amount of 0 to 100 parts by weight;
   then add and mix
3) carbonization auxiliaries in the amount of 0 to 100 parts by weight;
4) metal-containing compound having a carbonization accelerating effect, in the amount of 0 to 30 parts by weight;
5) filler, in the amount of 0 to 400 parts by weight;
6) heat reflecting agent, in the amount of 0 to 30 parts by weight;
Components A and B are first reacted, thereby producing an organic phosphorus-inorganic phosphorus oxyacid compound, then component C is added and reacted, thereby producing a basic salt of organic phosphorus-inorganic phosphorus oxyacid compound, then components 1, 2, 3, 5 and 6 are added and mixed thereby producing a flame retardant thermoplastic composition.

13. The flame retardant composition of claim 1 wherein the flammable organic material is polyisocyanate which has the formula $$Q(NCO)_m$$

in which m represent a number from 2 to 4 and Q represents an aliphatic hydrocarbon radical having 2 to 18 C atoms, a cycloaliphatic hydrocarbon radical having 4 to 15 C atoms, an aromatic hydrocarbon radical having 6 to 15 C atoms, or araliphatic hydrocarbon radical having 8 to 15 C atoms and an organic compounds with 1 or more active hydrogens which will react with an isocyanate, containing a urethane catalyst, a plasticizer, propellants and a silicone surfactant.

14. The flame retardant composition of claim 1 wherein the flammable organic material is an unsaturated polyester resin containing a free-radical initiator curing agent thereby producing a flame retardant polyester resin.

15. The flame retardant composition of claim 1 wherein the flammable organic material is a polyester resin.

16. The flame retardant composition of claim 1 wherein the flammable organic material is an polyepoxy resin containing an epoxy curing agent thereby producing flame retardant polyepoxy resin.

17. The flame retardant composition of claim 1 wherein the flammable organic material is a vinyl monomer containing a free-radical initiator curing system.

18. The flammable organic material of claim 1 wherein the flammable organic material is a polyamide thereby producing a flame retardant polyamide.

19. The flame retardant organic phosphorus-inorganic phosphorus oxyacid compound produced by the process consisting of mixing, heating and reacting at ambient pressure, in stoichiometric proportions, the following components:
   A) organic phosphorus compound containing phosphorus atom with a valence of 3 or 4, selected from the group consisting of organic phosphonates, phosphites, alkyl hydrogen phosphites, alkyl-aryl hydrogen phosphites, phosphorus esters and mixtures thereof in the amount of 25 to 100 parts by weight;
   B) inorganic phosphorus oxyacid compound with a valence of 5 and selected from the group consisting of phosphoric acid, polyphosphoric acid, pyrophosphoric acid, triphosphoric acid, metaphosphoric acid, phosphorus oxide and mixtures thereof, in the amount of 10 to 100 parts by weight.

20. The flame retardant organic phosphorus-inorganic phosphorus oxyacid compound of claim 19 wherein the inorganic oxyacid compound is selected from the group consisting of phosphoric acid, polyphosphoric acid, pyrophosphoric acid, triphosphoric acid, metaphosphoric acid, phosphorus oxide and mixtures thereof.

* * * * *